UNITED STATES PATENT OFFICE.

ERWIN ACHENBACH, OF HAMBURG, GERMANY.

ELECTRIC BATTERY.

1,098,606.

Specification of Letters Patent. Patented June 2, 1914.

No Drawing. Application filed February 6, 1913. Serial No. 746,637.

*To all whom it may concern:*

Be it known that I, ERWIN ACHENBACH, a subject of the German Emperor, and residing at Hamburg, in Germany, have invented new and useful Improvements in Electric Batteries, of which the following is a specification.

My invention relates to electric batteries, and consists in certain improvements, hereinafter specified, in the formation of primary galvanic cells of the manganese-porous bag type, by which their capacity is notably increased. These manganese-porous bag cells give good results when only small currents of, for example, 0.1 to 0.3 ampere are taken therefrom, but fail quickly when required to furnish larger currents of, for example, 0.4 to 1 ampere. In this case the fall of potential is so rapid, that only ¼, at the most, of the normal capacity is obtained. The reason for this fall in potential, which occurs even under short periods of load of about 0.3 ampere, lies in the poor conductivity of the manganese dioxid, which can, indeed, be improved by the addition of graphite, but not to such an extent, however, as to permit of high loads, which necessitate a rapid emission of oxygen from the manganese dioxid.

According to the present invention, mercuric oxid, preferably the red oxid (HgO), is added to the manganese-graphite mass, whereby the manganese dioxid in the galvanic cell is caused to give off its oxygen much more rapidly when the circuit is closed (during electrolysis). With this addition, the potential under continued load is considerably increased, and the capacity is itself materially greater under steady demands on the cell, amounting indeed to several times that of the ordinary manganese-porous bag cells, especially when an alkaline electrolyte, for example, potash or soda lye, is used. With such an electrolyte, a manganese superoxid cell, with addition of mercuric oxid, is capable of delivering heavy current with great capacity. With my construction of cell, the addition of mercuric oxid seems to cause the manganese super-oxid to more readily give off its oxygen during the discharging and also to improve the conductivity of the manganese super-oxid electrode, whereby the internal resistance of such a cell is diminished and its potential and capacity are, at the same time, considerably increased. Although manganese and mercuric oxid cells are old, yet applicant was the first to discover the valuable properties of a combination of manganese and mercuric oxid, with the other electrode made of zinc and with an alkaline electrolyte. It can be proved that, neither a purely manganese cell nor a purely mercuric oxid cell is capable of the output, measured by Watt-hour capacity per unit of weight, of which my combination, manganese - mercuric - oxid, and zinc electrodes in an alkaline electrolyte, is capable.

Having thus described my invention, what I claim is:—

1. A galvanic primary cell comprising an anode, an alkaline electrolyte, and a cathode, the latter consisting of a depolarizing mixture of graphite, manganese dioxid, and mercuric oxid.

2. A galvanic primary cell having an anode, an alkaline electrolyte, and a cathode and depolarizer composed of a mixture of graphite, manganese dioxid, and a substance not reacting with the alkaline electrolyte and serving as a conductor and catalyzer.

3. A galvanic primary cell having an anode, an alkaline electrolyte, and a cathode of graphite with a depolarizer, the depolarizer being manganese dioxid with an addition of a conducting catalyzer which does not react with the alkaline electrolyte.

In testimony whereof I have hereunto set my hand in presence of two subscribing witnesses.

ERWIN ACHENBACH.

Witnesses:
 ERNEST H. L. MUMMENHOFF,
 IDA CHRIST. HAFERMANN.